US008327658B2

(12) United States Patent
Douglas et al.

(10) Patent No.: US 8,327,658 B2
(45) Date of Patent: Dec. 11, 2012

(54) SYSTEM AND METHOD FOR OIL RETURN IN AN HVAC SYSTEM (75) Inventors: Jonathan D. Douglas, Bullard, TX (US); John R. Edens, Kilgore, TX (US); Alan D. Marble, Whitehouse, TX (US); Kevin B. Mercer, Troup, TX (US); Gary L. Sapp, Tyler, TX (US); James T. Schaefer, Jr., Tyler, TX (US); Kristen L. Schaefer, Tyler, TX (US); Steven A. Tice, Flint, TX (US)

(73) Assignee: Trane International, Inc., Piscataway, NJ (US)

( * ) Notice: Subject to any disclaimer, the term of this patent is extended or adjusted under 35 U.S.C. 154(b) by 639 days.

(21) Appl. No.: 12/272,518

(22) Filed: Nov. 17, 2008

(65) Prior Publication Data
US 2010/0123016 A1 May 20, 2010

(51) Int. Cl.
*F25B 13/00* (2006.01)
*F25D 21/06* (2006.01)
(52) U.S. Cl. ........................... 62/324.1; 62/155
(58) Field of Classification Search .................. 62/234, 62/155, 156, 129, 160, 80, 81, 84, 192, 324.1, 62/324.5, 324.6, 498; 236/49.3; 165/267
See application file for complete search history.

(56) References Cited

U.S. PATENT DOCUMENTS

| RE26,596 | E | * | 6/1969 | Jobes ............................. 165/232 |
|---|---|---|---|---|
| 4,326,387 | A | | 4/1982 | Friedman |
| 4,467,613 | A | | 8/1984 | Behr et al. |
| 4,749,881 | A | | 6/1988 | Uhrich |
| 4,882,908 | A | * | 11/1989 | White ............................. 62/155 |
| 4,974,420 | A | | 12/1990 | Kramer |
| 5,138,844 | A | | 8/1992 | Clanin et al. |
| 5,377,497 | A | | 1/1995 | Powell |
| 5,507,154 | A | | 4/1996 | Grant |
| 5,605,053 | A | | 2/1997 | Otori |
| 5,970,727 | A | | 10/1999 | Hiraoka et al. |
| 6,021,644 | A | | 2/2000 | Ares et al. |
| 6,181,538 | B1 | | 1/2001 | Yoo |
| 6,216,479 | B1 | | 4/2001 | Elwood |
| 6,434,957 | B1 | | 8/2002 | Nishizuka et al. |

(Continued)

FOREIGN PATENT DOCUMENTS

KR 2005037782 A * 4/2005

*Primary Examiner* — Chen Wen Jiang
(74) *Attorney, Agent, or Firm* — Conley Rose, P.C.; J. Robert Brown, Jr.

(57) ABSTRACT

A system and a method are provided for returning oil in a heating, ventilation, and air conditioning (HVAC) system by determining when an ambient zone temperature is equal to or less than a temperature limit and reversing a direction of refrigerant flow of the HVAC system based on the length of time. Also, a system and a method are provided for monitoring the length of operation in a first and a second heating mode and for reversing a direction of refrigerant flow based on the length of time operation occurs in the first and second heating modes. A system and a method having a first compressor, a first heating mode, a second heating mode, a defrost mode, and a controller is disclosed. The controller selectively controls initiation of the defrost mode in response to an HVAC system operating in a heating mode of operation for a predetermined amount of time.

9 Claims, 4 Drawing Sheets

U.S. PATENT DOCUMENTS

| | | |
|---|---|---|
| 6,658,373 B2 | 12/2003 | Rossi et al. |
| 6,842,650 B2 | 1/2005 | Bennett |
| 7,024,254 B2 | 4/2006 | Salsbury et al. |
| 7,079,967 B2 | 7/2006 | Rossi et al. |
| 7,222,494 B2 | 5/2007 | Peterson et al. |
| 7,290,600 B2 * | 11/2007 | Gavula .......................... 165/231 |

* cited by examiner

SYSTEM AND METHOD FOR OIL RETURN IN AN HVAC SYSTEM

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND

Heating, ventilation, and air conditioning systems (HVAC systems) are used in residential and/or commercial areas for heating and/or cooling to create comfortable temperatures inside those areas. These temperature controlled areas may be referred to as comfort zones. Comfort zones may comprise different zone conditions (i.e., temperature, humidity, etc.) and the locations in which the HVAC systems are installed or otherwise associated with for the purpose of performing heat exchange (sometimes referred to as an ambient zone) may also have different conditions. Both the zone conditions and the conditions of the location affect operation of the HVAC systems and, where the conditions are different, may result in otherwise substantially similar HVAC systems operating at different efficiencies. Some HVAC systems are heat pump systems. Heat pump systems are generally capable of cooling a comfort zone by operating in a cooling mode for transferring heat from a comfort zone to an ambient zone using a refrigeration cycle (i.e., Rankine cycle). When the temperature of an ambient zone in which a portion of an HVAC system is installed or otherwise associated with is colder than the temperature of a comfort zone with which the HVAC system is associated, the heat pump systems are also generally capable of reversing the direction of refrigerant flow (i.e., a reverse-Rankine cycle) through the components of the HVAC system so that heat is transferred from the ambient zone to the comfort zone (a heating mode), thereby heating the comfort zone.

In some cases where moisture is present in the cold ambient zone, the moisture condenses on the HVAC system (e.g., the components of the HVAC system). Accordingly, when the ambient temperature is below a freezing point, frost and/or ice may accumulate on the HVAC system. This accumulation of frost and/or ice is detrimental to the ability of the HVAC system to perform at its optimum energy efficiency. In order for the HVAC system to perform efficiently, the frost and/or ice on the HVAC system should be removed (e.g., defrosted). Accordingly, the HVAC systems that provide refrigerant-based heating are often configured to perform a defrost function whereby the components of the HVAC system that are at least partially covered in frost and/or ice are heated to melt the frost and/or ice performing the defrosting is achieved by reversing the direction of refrigerant flow from the direction of flow used in the heating mode. Specifically, the refrigerant flow is such that heat is transferred from the comfort zone to the ambient zone during the defrosting of the HVAC system components. The heat pump systems generally use a reversing valve for rerouting the direction of refrigerant flow between the compressor and the heat exchangers associated with the comfort zone and the ambient zone. This act of defrosting consumes energy that could be used to heat the comfort zone but allows oil in the system to be returned to the compressor(s), and therefore, the benefit of defrosting must be carefully weighed against the alternative of simply allowing the HVAC system to operate with less oil in the compressor(s).

SUMMARY OF THE DISCLOSURE

In one embodiment, a method is provided that includes determining when an ambient zone temperature is equal to or less than a first temperature limit and calculating a first length of time using a first timer. The first length of time is the length of time that a first compressor operates and during which operation the ambient zone temperature is equal to or less than the first temperature limit. Further, the method reverses a direction of refrigerant flow when the first length of time is equal to or greater than a first time limit.

In other embodiments, a method is provided that includes monitoring the length of time an HVAC system operates in a first heating mode and monitoring the length of time the HVAC system operates in a second heating mode. Further, the method reverses a direction of refrigerant flow if the HVAC system operates in the first heating mode for a first predetermined length of time prior to the HVAC system being operated continuously in the second heating mode for a second predetermined length of time.

In yet other embodiments, an HVAC system is provided that comprises a first compressor, a first heating mode of operation, a second compressor, a second heating mode of operation, and a defrost mode of operation. The HVAC system further comprises a controller for selectively controlling initiation of the defrost mode of operation in response to the HVAC system operating in the first heating mode of operation for a first predetermined amount of time or in response to the HVAC system operating in the second heating mode for a second predetermined amount of time.

The various characteristics described above, as well as other features, will be readily apparent to those skilled in the art upon reading the following detailed description of the embodiments of the disclosure, and by referring to the accompanying drawings.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

Figure 1:
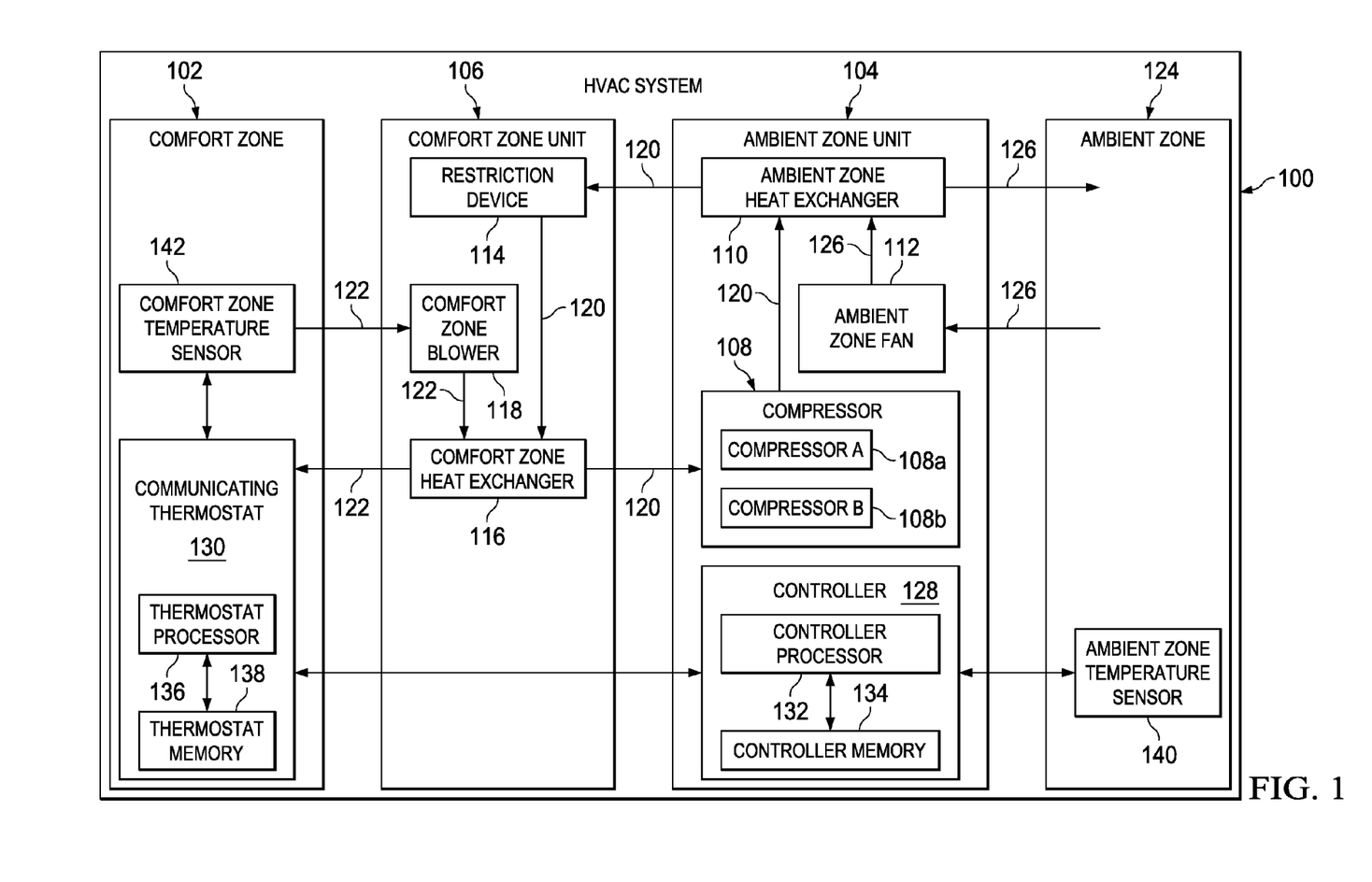
FIG. 1 is a simplified block diagram of an HVAC system according to embodiments of the disclosure.

FIG. 1 is a simplified schematic diagram of a heating/ventilation/air conditioning system 100 (hereinafter referred to as an "HVAC system 100") according to an embodiment. The HVAC system 100 operates to selectively control the temperature, humidity, and/or other air quality factors of a comfort zone 102. The HVAC system 100 generally comprises an ambient zone unit 104 and a comfort zone unit 106. The ambient zone unit 104 comprises a compressor 108, an ambient zone heat exchanger 110, and an ambient zone fan 112. The comfort zone unit 106 comprises a restriction device 114, a comfort zone heat exchanger 116, and a comfort zone blower 118. Refrigerant is carried between the compressor 108, the ambient zone heat exchanger 110, the restriction device 114, and the comfort zone exchanger 116 through refrigerant tubes 120.

The comfort zone blower 118 forces air from the comfort zone 102 into contact with the comfort zone heat exchanger 116, and subsequently back into the comfort zone 102 through air ducts 122. Similarly, the ambient zone fan 112 forces air from an ambient zone 124 into contact with the ambient zone heat exchanger 110 and subsequently back into the ambient zone 124 along an ambient air flow path 126. The HVAC system 100 is generally controlled by interactions between a controller 128 and a communicating thermostat 130. The controller 128 comprises a controller processor 132 and a controller memory 134 while the communicating thermostat 130 comprises a thermostat processor 136 and a thermostat memory 138.

Further, the controller 128 communicates with an ambient zone temperature sensor 140 while the communicating thermostat 130 communicates with a comfort zone temperature sensor 142. In this embodiment, communications between the controller 128 and the communicating thermostat 130, the controller 128 and the ambient zone temperature sensor 140, and the communicating thermostat 130 and the comfort zone temperature sensor 142 are capable of bidirectional communication. Further, communications between the controller processor 132 and the controller memory 134 and between the thermostat processor 136 and the thermostat memory 138 are capable of bidirectional communication. However, in alternative embodiments, the communication between some components may be unidirectional rather than bidirectional.

The HVAC system 100 is called a "split-system" because the compressor 108, the ambient zone heat exchanger 110, and the ambient zone fan 126 are collocated in the ambient zone unit 104 while the restriction device 114, comfort zone heat exchanger 116, and comfort zone blower 118 are collocated in the comfort zone unit 106 separate from the ambient zone unit 104. However, in alternative embodiments of an HVAC system, substantially all of the components of the ambient zone unit 104 and the comfort zone unit 106 may be collocated in a single housing in a system called a "package system." Further, in alternative embodiments, an HVAC system may comprise heat generators such as electrically resistive heating elements and/or gas furnace elements so that a comfort zone heat exchanger and the heat generators are both in a shared airflow path of a comfort zone blower.

While the comfort zone 102 may commonly be associated with a living space of a house or an area of a commercial building occupied by people, the comfort zone 102 may be also be associated with any other area in which it is desirable to control the temperature, humidity, and/or other air quality factors (i.e. computer equipment rooms, animal housings, and chemical storage facilities). Further, while the comfort zone unit 106 is shown as being located outside the comfort zone 102 (i.e. within an unoccupied attic or crawlspace), the comfort zone unit may alternatively be located within or partially within the comfort zone 102 (i.e. in an interior closet of a building).

Each of the ambient zone heat exchanger 110 and the comfort zone heat exchanger 116 may be constructed as air coils, shell and tube heat exchangers, plate heat exchangers, regenerative heat exchangers, adiabatic wheel heat exchangers, dynamic scraped surface heat exchangers, or any other suitable form of heat exchanger. The compressor 108 may be constructed as any suitable compressor, for example, a centrifugal compressor, a diagonal or mixed-flow compressor, an axial-flow compressor, a reciprocating compressor, a rotary screw compressor, a rotary vane compressor, a scroll compressor, or a diaphragm compressor. In this embodiment, the compressor 108 capable of operating in multiple stages (e.g., stage A and stage B). More specifically, the compressor 108 comprises a compressor A 108a (for stage A) and a compressor B 108b (for stage B). Alternative embodiments of an HVAC system may comprise one or more compressors that are operable at more than one speed or at a range of speeds (i.e., a variable speed compressor).

Further, while the HVAC system 100 is shown as operated in a cooling mode to remove heat from the comfort zone 102, the HVAC system 100 is configured as a "heat pump" system that selectively allows flow of refrigerant in the direction shown in FIG. 1 to cool the comfort zone 102 or in the reverse direction to that shown in FIG. 1 to heat the comfort zone 102 in a heating mode. It will further be appreciated that in alternative embodiments, a second restriction device substantially similar to restriction device 114 may be incorporated into an ambient zone unit to assist with operation of an HVAC system in a heating mode substantially similar to the heating mode of HVAC system 100.

In the cooling mode, the compressor 108 operates to compress low pressure gas refrigerant into a hot and high pressure gas that is passed through the ambient zone heat exchanger 110. As the refrigerant is passed through the ambient zone heat exchanger 110, the ambient zone fan 112 operates to force air from the ambient zone 124 into contact with the ambient zone heat exchanger 110, thereby removing heat from the refrigerant and condensing the refrigerant into high pressure liquid form. The liquid refrigerant is then delivered to the restriction device 114. Forcing the refrigerant through the restriction device 114 causes the refrigerant to transform into a cold and low pressure gas. The cold gas is passed from the restriction device 114 into the comfort zone heat exchanger 116. While the cold gas is passed through the comfort zone heat exchanger 116, the comfort zone blower 118 operates to force air from the comfort zone 102 into contact with the comfort zone heat exchanger 116, heating the refrigerant and thereby providing a cooling and dehumidifying effect to the air, which is then returned comfort zone 102. In this embodiment, the HVAC system is using a vapor compression cycle, namely, the Rankine cycle. In the heating mode, generally, the direction of the flow of the refrigerant is reversed (compared to that shown in FIG. 1) so that heat is added to the comfort zone 102 using a reverse-vapor compression cycle, namely, the reverse-Rankine cycle. It will be appreciated that alternative embodiments of an HVAC system may use any other suitable thermodynamic cycle for transferring heat to and/or from a comfort zone.

Generally, the controller 128 communicates with the ambient zone temperature sensor 140 that is located in the ambient zone 124 (i.e. outdoors, outdoors within the ambient zone unit in an embodiment where the ambient zone unit is located in the ambient zone, adjacent the ambient zone unit in an embodiment where the ambient zone unit is located in the ambient zone, or any other suitable location for providing an ambient zone temperature or a temperature associated with the ambient zone). While the controller 128 is illustrated as positioned within the ambient zone unit 104, in alternative embodiments, the controller 128 may be positioned adjacent to but outside an ambient zone unit, outside a comfort zone, within a comfort zone unit, within a comfort zone, or at any other suitable location. It will be appreciated that in alternative embodiments, an HVAC system may comprise a second controller substantially similar to controller 128 and that the second controller may be incorporated into a comfort zone unit substantially similar to comfort zone unit 106. In the embodiment shown in FIG. 1, through the use of the controller processor 132 and the controller memory 134, the controller 128 is configured to process instructions and/or algorithms that generally direct the operation of the HVAC system 100.

When the HVAC system 100 is used to heat the comfort zone 102, lubricating oil that normally resides within the compressor 108 tends to migrate away from the compressor 108 through refrigerant tubes 120 along with the flow of refrigerant leaving the compressor 108. Further, the migration of lubricating oil away from the compressor 108 tends to be exacerbated when operating the HVAC system 100 in the low stage heating mode (stage A), where the flow rate within the refrigerant tubes 120 is relatively low. This migration of lubricating oil can be detrimental to the length of service of the compressor 108. Particularly, the reduced amount of the lubricating oil in the compressor 108 generally tends to increase the wear and tear of the compressor 108 components as the compressor 108 is operated with the reduced amount of lubricating oil.

However, by operating the HVAC system 100 in defrost mode (i.e., with the refrigerant moving in the cooling mode direction), the lubricating oil that has migrated away from the compressor 108 in the refrigerant tubes 120 is pushed back toward the compressor 108. In other words, while operation of the HVAC system 100 in a heating mode leads to migration of oil away from the compressor 108, subsequent operation of the HVAC system 100 in defrost mode (i.e., performing a defrost) returns the oil to the compressor 108. In this embodiment, the controller 128 operates to monitor HVAC system 100 operation in heating modes (where lubricating oil migrates away from the compressor 108). The controller 128 further operates to cause operation of the HVAC system 100 in defrost mode (where lubricating oil is returned to the compressor 108) in response to the length of time the compressor 108 is determined to have run in the heating modes.

Figure 2:
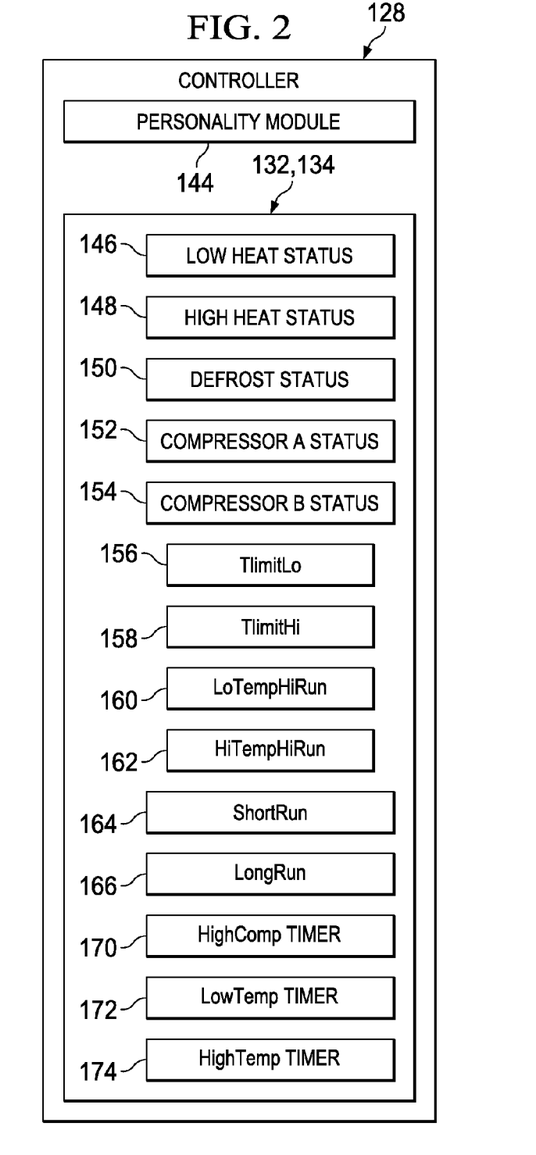
FIG. 2 is a simplified block diagram of a controller of the HVAC system of FIG. 1 according to embodiments of the disclosure.

Referring now to FIG. 2, the controller 128 is shown in greater detail. The controller 128 is used to control the different components of the HVAC system 100. The controller 128 further comprises a personality module 144 that stores information about the HVAC system 100 and the components thereof. The controller 128 retrieves information stored on the personality module 144 and gives instructions to the controller processor 132 and controller memory 134 based on the information provided by the personality module 144. The controller processor 132 and controller memory 134 comprise and/or operate to provide any necessary logical state indicators, keys, memories, timers, flags, counters, pollers, monitors, callers, and status indicators for processing and/or performing any programs, instructions, and/or algorithms provided to the controller 128.

The controller 128 comprises a plurality of algorithm status variables, specifically, a low heat status 146, a high heat status 148, a defrost status 150, a compressor A status 152, and a compressor B status 154. The low heat status 146 yields a positive result when the HVAC system 100 is called to operate in a low heat mode while the high heat status 148 yields a positive result when the HVAC system 100 is called to operate in a high heat mode. The compressor A status 152 yields a positive result when the compressor A 108a is actually operating while the compressor B status 154 yields a positive result when the compressor B 108b is actually operating. The defrost status 150 yields a positive result when the HVAC system 100 is being operated in a defrost mode.

The controller 128 further comprises a plurality of stored variables, specifically, a TlimitLo 156, a TlimitHi 158, a LoTempHiRun 160, a HiTempHiRun 162, a ShortRun 164, and a LongRun 166. The variables TlimitLo 156 and TlimitHi 158 each store a temperature value while the variables LoTempHiRun 160, HiTempHiRun 162, ShortRun 164, and LongRun 166 each store time values. The temperature variables are configurable to represent and/or store temperatures in degrees Fahrenheit (° F.), degrees Celsius (° C.), Kelvin (K), or degrees Rankine (° R), however this embodiment uses degrees Fahrenheit.

In this embodiment, TlimitLo 156 stores a value of 28° F. However, in alternative embodiments, a TlimitLo may store any other suitable temperature value within a range of about 6° F. to about 42° F. In this embodiment, TlimitHi 158 stores a value of 45° F. However, in alternative embodiments, a TlimitHi may store any other suitable temperature value within a range of about 42° F. to about 60° F.

Further, in this embodiment, LoTempHiRun 160 stores a value of 15 minutes and HiTempHiRun 162 stores a value of 5 minutes. However, in alternative embodiments, a LoTempHiRun may store any other suitable time value within a range of about 5 minutes to about 20 minutes. Similarly, in alternative embodiments, a HiTempHiRun may store any other suitable time value within a range of about 3 minutes to about 20 minutes.

Still further, in this embodiment, ShortRun 164 stores a value of 3 hours and LongRun 166 stores a value of 8 hours. However, in alternative embodiments, a ShortRun may store any other suitable time value within a range of about 1 hour to about 6 hours. Similarly, in alternative embodiments, a LongRun may store any other suitable time value within a range of about 5 hours to about 9 hours.

Still referring to FIG. 2, the controller 128 further comprises a plurality of timers, specifically, a HighComp Timer 170, a LowTemp Timer 172 and a HighTemp Timer 174. The HiComp Timer 170 is a timer configured to selectively store and report a cumulative length of time compressor B 108b has run since the HiComp Timer 170 was last reset to zero. The LowTemp Timer 172 is a timer configured to selectively store and report a cumulative length of time compressor A 108a has run while the temperature of the ambient zone 124 is less than or equal to the value of TlimitLo 156 since the LowTemp Timer 172 was last reset to zero. The HighTemp Timer 174 is a timer configured to selectively store and report a cumulative length of time compressor A 108a has run while the temperature of the ambient zone 124 is less than or equal to the value of TlimitHi 158 since the HighTemp Timer 174 was last reset to zero.

In this embodiment, the values for the TlimitLo 156, the TlimitHi 158, the LoTempHiRun 160, the HiTempHiRun 162, the ShortRun 164, and the LongRun 166 are provided to the controller 128 from the personality module 144. In alternative embodiments of an HVAC system, the values for a TlimitLo, a TlimitHi, a LoTempHiRun, a HiTempHiRun, a ShortRun, and/or a LongRun may be selected by a user, hard coded into a controller 128, or provided in any other suitable manner.

Figure 3:
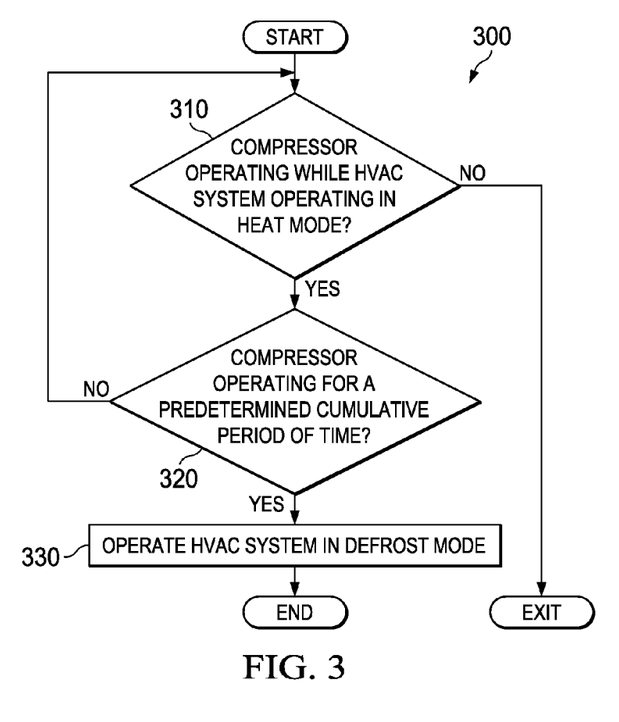
FIG. 3 is a schematic flow chart that illustrates a method of operating the HVAC system of FIG. 1 according to the disclosure.

Referring now to FIG. 3, a flow chart of a method 300 of operating an HVAC system such as HVAC system 100 is shown. After starting the method, the method 300 determines at block 310 whether the compressor 108 is operating while the HVAC system 100 is in a heating mode (either low heating mode or high heating mode). If the compressor is not operating while the HVAC system 100 is in a heating mode, the method 300 is terminated. If the compressor 108 is operating while the HVAC system 100 is in a heating mode, the method progresses to block 320. At block 320, the method 300 determines whether the compressor 108 has been operating for a predetermined cumulative period of time. If the compressor 108 has not been operating for the predetermined period of time, the method 300 returns to block 310. If the compressor has been operating for the predetermined period of time, the method 300 continues to block 330. At block 330, the HVAC system 100 is operated in the defrost mode, thereby returning oil to the compressor 108. After operating the HVAC system 100 in the defrost mode, the method 300 terminates. This method may be run once or may be re-executed or re-started in periodic intervals equal to one second at any time during heating operations. In alternative embodiments, the periodic time intervals may be shorter or longer.

Figure 4:
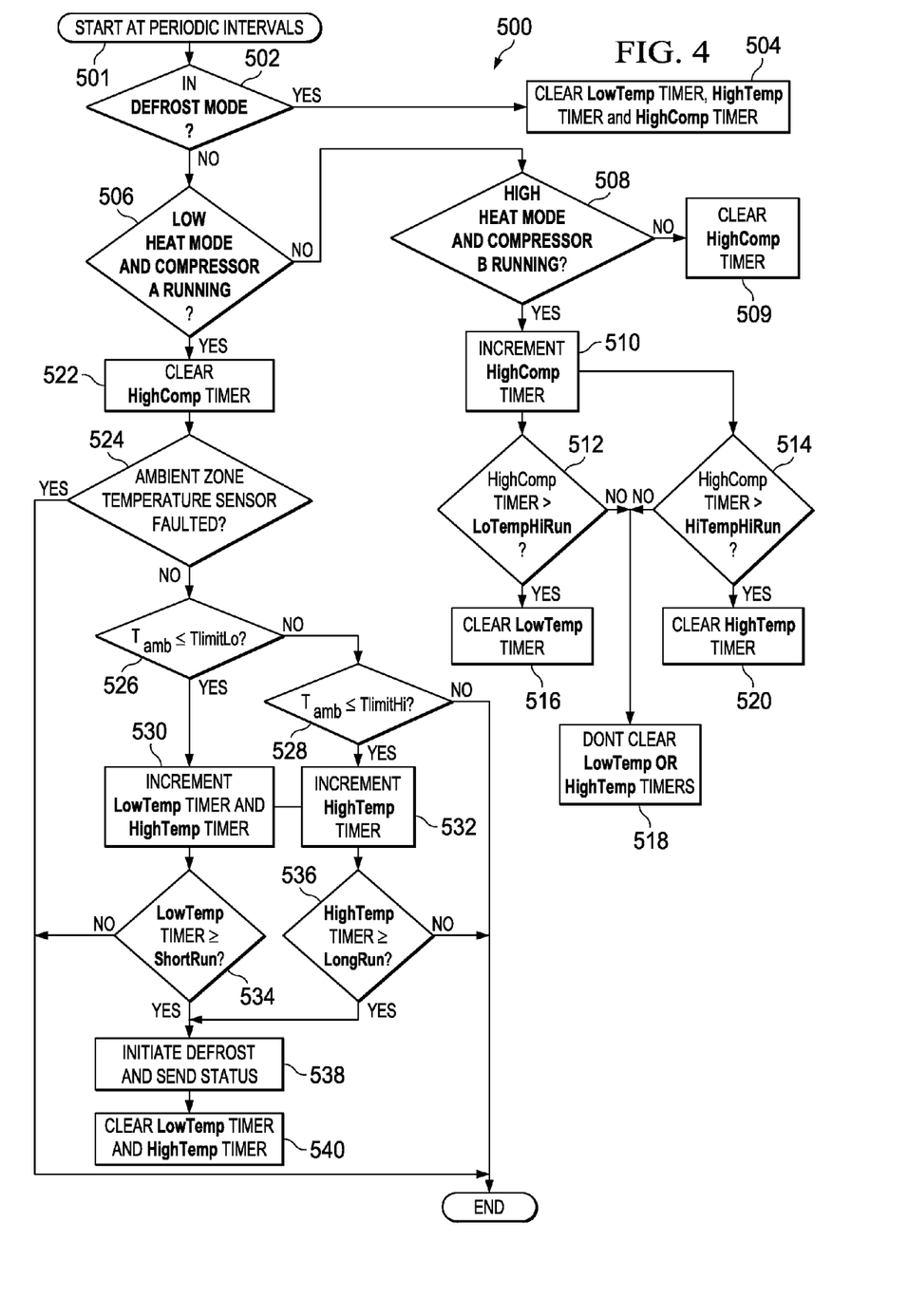
FIG. 4 is a schematic flow chart that illustrates an alternative method of operating the HVAC system of FIG. 1.

Referring now to FIG. 4, a flow chart of a method 500 of operating an HVAC system such as HVAC system 100 is shown. When enabled for operation, the method 500 is executed or started in periodic time intervals equal to about one second during heating operations. In alternative embodiments, the periodic time intervals may be shorter or longer. The method 500 starts at block 501 and then proceeds to block 502. At block 502, the method 500 determines whether the HVAC system 100 is in a defrost mode. If the HVAC system 100 is in a defrost mode, the method proceeds to block 504. At block 504, each of the LowTemp Timer 172, HighTemp Timer 174, and HighComp Timer 170 are reset to zero and the method 500 is exited for subsequent periodic restarting. However, if the HVAC system 100 is not in defrost mode at block 502, the method 500 proceeds to block 506.

At block 506, the method determines if the HVAC system 100 is operating in low heat mode (where low heat status 146 yields a positive result) and if compressor A 108a (i.e., the low stage compressor) is actually running. If the HVAC system 100 is running in low heat mode and compressor A 108a is running, the method 500 proceeds to block 522 where the HighComp Timer 170 is reset to zero. However, if both of those conditions are not met at block 506, the method 500 proceeds to block 508.

At block 508, the method 500 determines whether if the HVAC system 100 is operating in high heat mode (where high heat status 148 yields a positive result) and if compressor B 108b (i.e., the high stage compressor) is actually running. If the HVAC system 100 is running in high heat mode and compressor B 108b is running, the method 500 proceeds to block 510 where the HighComp Timer 170 is incremented (i.e., increased by one second since the method 500 is in one second intervals, or alternatively the timers may simply gather operation time as a chronometer). However, if both of those conditions are not met at block 508, the method 500 proceeds to block 509 where the HighComp Timer 170 is reset to zero and the method 500 is exited for subsequent periodic restarting.

Assuming that the method has proceeded to and performed block 510, the method 500 then proceeds to substantially simultaneously perform the actions of blocks 512 and 514. At block 512, the method 500 determines whether the value of the HighComp Timer 170 is greater than the value of LoTempHiRun 160. In this embodiment, this means that the method 500 determines whether the HighComp Timer 170 value exceeds 15 minutes (the value of LoTempHiRun 160). If the HighComp Timer 170 value is greater than the value of LoTempHiRun 160, the method proceeds to block 516 where the LowTemp Timer 172 is reset to zero.

Similarly, at block 514, the method 500 determines whether the value of the HighComp Timer 170 is greater than the value of HiTempHiRun 162. In this embodiment, this means that the method 500 determines whether the HighComp Timer 170 value exceeds 5 minutes (the value of HiTempHiRun 162). If the HighComp Timer 170 value is greater than the value of HiTempHiRun 162, the method proceeds to block 520 where the HighTemp Timer 174 is reset to zero.

If at blocks 512 and 514 it is determined that HighComp Timer 170 is not greater than either LoTempHiRun 160 or HiTempHiRun 162, the method 500 proceeds to block 518 where neither the LowTemp Timer 172 nor the HighTemp Timer 174 is reset. In other words, at block 518, the LowTemp Timer 172 and the HighTemp Timer 174 are allowed to retain their current values, or continue gathering operation time, and the method 500 is exited for subsequent periodic restarting. Similarly, after blocks 516 and 520 are performed (as previously discussed), the method 500 is exited for subsequent periodic restarting.

If the method 500 progresses to block 522 from block 506 rather than progressing to block 508 (as previously discussed), the method 500 proceeds to block 524 from block 522, after the HighComp Timer 170 is reset to zero. At block 524, the method 500 determines whether the ambient zone temperature sensor 140 is faulted (i.e., failed or non-operational). If the ambient zone temperature sensor 140 is faulted, the method 500 is exited for subsequent periodic restarting. If the ambient zone temperature sensor 140 is not faulted, the method 500 proceeds to block 526.

At block 526, the method 500 determines whether the ambient zone temperature (as reported by the ambient zone temperature sensor 140) is less than or equal to the value of TlimitLo 156. In this embodiment, the value of TlimitLo 156 is 28° F. If the ambient zone temperature is less than or equal to the value of TlimitLo 156, the method 500 proceeds to block 530 where the LowTemp Timer 172 and the HighTemp Timer 174 are both incremented (i.e., increased by one second since the method 500 is in one second intervals, or alternatively the timers may simply gather operation time as a chronometer).

If at block 526, the ambient zone temperature is not less than or equal to the value of TlimitLo 156, the method 500 proceeds to block 528 where the method 500 determines whether the ambient zone temperature (as reported by the ambient zone temperature sensor 140) is less than or equal to the value of TlimitHi 158. In this embodiment, the value of TlimitHi is 45° F. If the ambient zone temperature is not less than or equal to the value of TlimitHi 158, the method 500 is exited for subsequent periodic restarting. If the ambient zone temperature is less than or equal to the value of TlimitHi 158, the method 500 progresses to block 532 where The HighTemp Timer 174 is incremented (i.e., increased by one second since the method 500 is in one second intervals, or alternatively the timers may simply gather operation time as a chronometer).

If either blocks 530 or 532 are performed as described above, the method 500 proceeds to perform blocks 534 and 536 substantially simultaneously. At block 534, the method determines whether the value of the LowTemp Timer 172 is greater than or equal to the value of ShortRun 164. At block 536, the method 500 determines whether the value of the HighTemp Timer 174 is greater than or equal to the value of LongRun 166. If either the LowTemp Timer 172 is greater than or equal to the value of ShortRun 164 or the value of the HighTemp Timer 174 is greater than or equal to the value of LongRun 166, the method 500 proceeds to block 538. If neither the LowTemp Timer 172 is greater than or equal to the value of ShortRun 164 nor is the value of the HighTemp Timer 174 greater than or equal to the value of LongRun 166, the method 500 is exited for subsequent periodic restarting.

At block 538, the method 500 initiates operation of the HVAC system 100 in a defrost mode (causing defrost status 150 to yield a positive result). During operation of the HVAC system 100 in the defrost mode, the method 500 communicates a message to the communicating thermostat 130 to activate a visual alert signifying that the HVAC system 100 is in a defrost mode.

Once the defrost mode has terminated (typically after a predetermined duration of operating HVAC system in defrost mode), the method 500 proceeds to block 540 where the LowTemp Timer 172 and the HighTemp Timer 174 are reset to zero. After performing block 540, the method 500 is exited for subsequent periodic restarting.

Figure 5:
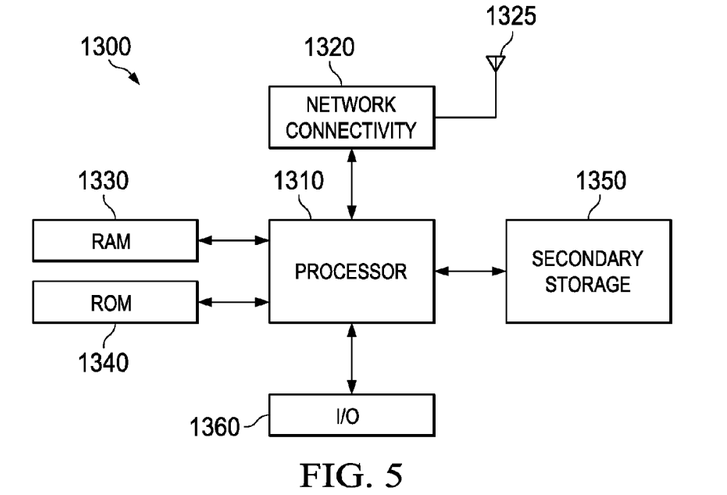
FIG. 5 illustrates a general-purpose processor (e.g., electronic controller or computer) system suitable for implementing the several embodiments of the present disclosure.

Referring now to FIG. 5, the HVAC system 100 described above comprises a processing component (such as processors 132 or 136 shown in FIG. 1) that is capable of executing instructions related to the actions described previously. The processing component may be a component of a computer system. FIG. 5 illustrates a typical, general-purpose processor (e.g., electronic controller or computer) system 1300 that includes a processing component 1310 suitable for implementing one or more embodiments disclosed herein. In addition to the processor 1310 (which may be referred to as a central processor unit or CPU), the system 1300 might include network connectivity devices 1320, random access memory (RAM) 1330, read only memory (ROM) 1340, secondary storage 1350, and input/output (I/O) devices 1360. In some cases, some of these components may not be present or may be combined in various combinations with one another or with other components not shown. These components might be located in a single physical entity or in more than one physical entity. Any actions described herein as being taken by the processor 1310 might be taken by the processor 1310 alone or by the processor 1310 in conjunction with one or more components shown or not shown in the drawing.

The processor 1310 executes instructions, codes, computer programs, or scripts that it might access from the network connectivity devices 1320, RAM 1330, ROM 1340, or secondary storage 1350 (which might include various disk-based systems such as hard disk, floppy disk, optical disk, or other drive such as the personality module 144 shown in FIG. 2). While only one processor 1310 is shown, multiple processors may be present. Thus, while instructions may be discussed as being executed by a processor, the instructions may be executed simultaneously, serially, or otherwise by one or multiple processors. The processor 1310 may be implemented as one or more CPU chips.

The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1320 may enable the processor 1310 to communicate with the Internet or one or more telecommunications networks or other networks from which the processor 1310 might receive information or to which the processor 1310 might output information.

The network connectivity devices 1320 might also include one or more transceiver components 1325 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1325 might include separate receiving and transmitting units or a single transceiver. Information transmitted or received by the transceiver 1325 may include data that has been processed by the processor 1310 or instructions that are to be executed by processor 1310. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs or instructions that are loaded into RAM 1330 when such programs are selected for execution or information is needed.

The I/O devices 1360 may include liquid crystal displays (LCDs), touch screen displays, keyboards, keypads, switches, dials, mice, track balls, voice recognizers, card readers, paper tape readers, printers, video monitors, transducers, sensors, or other well-known input or output devices. Also, the transceiver 1325 might be considered to be a component of the I/O devices 1360 instead of or in addition to being a component of the network connectivity devices 1320. Some or all of the I/O devices 1360 may be substantially similar to various components depicted in the previously described FIG. 1, such as the temperature sensors 142 and 140.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: $R=Rl+k*(Ru-Rl)$, wherein k is a variable ranging from 1 percent to 100 percent with a 1 percent increment, i.e., k is 1 percent, 2 percent, 3 percent, 4 percent, 5 percent, ... 50 percent, 51 percent, 52 percent, ..., 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. A method of controlling a heating, ventilation, and air conditioning (HVAC) system, comprising:
   determining when an ambient zone temperature is equal to or less than a first temperature limit;
   calculating a first length of time using a first timer, the first length of time being the length of time that a first compressor operates at a first capacity to deliver refrigerant to a first circuit of a first heat exchanger and during which operation the ambient zone temperature is equal to or less than the first temperature limit;
   reversing a direction of refrigerant flow of the HVAC system when the first length of time is equal to or greater than a first time limit;
   determining when the ambient zone temperature is equal to or less than a second temperature limit, the second temperature limit having a value higher than the value of the first temperature limit;
   calculating a second length of time using a second timer, the second length of time being the length of time that the first compressor operates at a second capacity to deliver refrigerant to the first circuit of the first heat exchanger, the second capacity being different than the first capacity, and during which operation the ambient zone temperature is equal to or less than the second temperature limit; and
   reversing the direction of refrigerant flow of the HVAC system when the second length of time is equal to or greater than a second time limit.

2. The method according to claim 1, further comprising:
   setting a value of the first timer to zero in response to the direction of refrigerant flow being reversed.

3. The method according to claim 1, wherein the reversing of the refrigerant flow is accomplished by operating the HVAC system in a defrost mode.

4. The method according to claim 1, further comprising:
   calculating a third length of time using a third timer, the third length of time being the length of time that a second compressor operates.

5. The method according to claim 4, further comprising:
   setting a value of at least one of the first timer and the second timer to zero when the value of the third timer is equal to or greater than a third time limit.

6. The method according to claim 5, further comprising:
   setting a value of at least one of the first timer and the second timer to zero when the value of the third timer is equal to or greater than a fourth time limit;
   wherein the fourth time limit is greater than the third time limit.

7. The method according to claim 6, wherein the first temperature limit is a value between about 6° F. to about 42° F., the second temperature limit is a value between about 42° F. to about 60° F., the first time limit is a value between about 1 hour to about 6 hours, the second time limit is a value between about 5 hours to about 9 hours, the third time limit is a value between about 5 minutes to about 20 minutes, and the fourth time limit is a value between about 3 minutes to about 20 minutes.

8. The method according to claim 6, wherein the first temperature limit is a 28° F., the second temperature limit is 45° F., the first time limit is 3 hours, the second time limit is 8 hours, the third time limit is 15 minutes, and the fourth time limit is 5 minutes.

9. A method of controlling a heating, ventilation, and air conditioning (HVAC) system, comprising:
   determining when an ambient zone temperature is equal to or less than a first temperature limit;
   without respect to a temperature of an ambient zone heat exchanger, calculating a first length of time using a first timer, the first length of time being the length of time that a first compressor operates at a first capacity and during which operation the ambient zone temperature is equal to or less than the first temperature limit;
   reversing a direction of refrigerant flow of the HVAC system when the first length of time is equal to or greater than a first time limit;
   determining when the ambient zone temperature is equal to or less than a second temperature limit;
   without respect to the temperature of the ambient zone heat exchanger, calculating a second length of time using a second timer, the second length of time being the length of time that the first compressor operates at a second capacity and during which operation the ambient zone temperature is equal to or less than the second temperature limit; and
   reversing a direction of refrigerant flow of the HVAC system when the second length of time is equal to or greater than the second time limit;
   wherein the first temperature limit is lower than the second temperature limit and the first capacity is lower than the second capacity.

* * * * *

UNITED STATES PATENT AND TRADEMARK OFFICE
CERTIFICATE OF CORRECTION

PATENT NO. : 8,327,658 B2
APPLICATION NO. : 12/272518
DATED : December 11, 2012
INVENTOR(S) : Jonathan D. Douglas et al.

It is certified that error appears in the above-identified patent and that said Letters Patent is hereby corrected as shown below:

On the Title Page, Item (75) Inventors: - "Kristen L. Schaefer" should read "Kristin L. Schaefer"

Signed and Sealed this
Sixteenth Day of December, 2014

Michelle K. Lee
*Deputy Director of the United States Patent and Trademark Office*